Patented Nov. 1, 1932

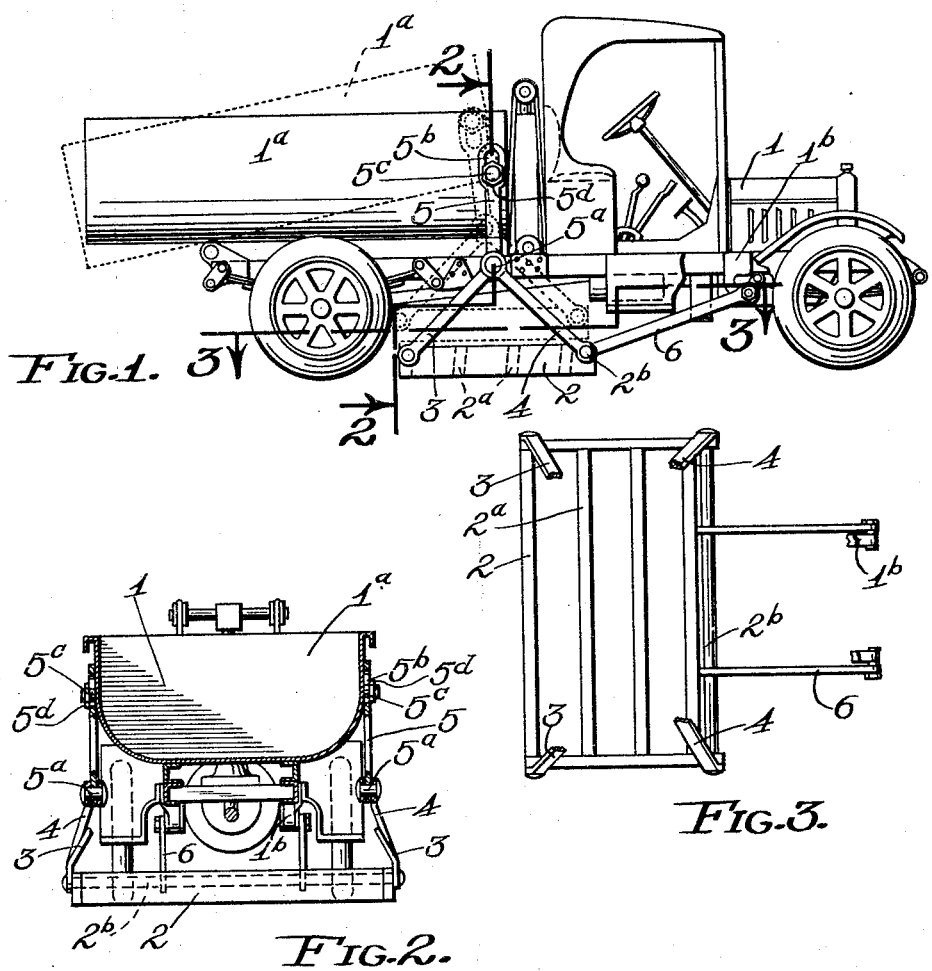

1,885,468

UNITED STATES PATENT OFFICE

HOWARD J. NEVIN, OF ESCONDIDO, CALIFORNIA

COMBINED DUMP TRUCK AND ROAD DRAG

Application filed July 17, 1931. Serial No. 551,381.

My invention relates to a combined dump truck and road drag, more particularly relating to dump trucks in which the front portion of the dump body is tilted upwardly for unloading and the load dumped out of the rear end, and the objects of my invention are:

First, to provide a combined dump truck and drag in which the mechanism for operating the dump body of the dump truck will raise the drag off the ground when transporting from place to place where not desired to drag the ground.

Second, to provide a drag which may be readily attached and detached from a conventional dump truck.

Third, to provide a structure of the class described in which the drag is positioned underneath the dump truck when in operation and is more under control than where the drag is drawn behind the truck.

Fourth, to provide a combination dump truck and drag which is new and novel.

Fifth, to provide a combination of this class in which when the drag is detached from the truck, the truck may be used in the usual manner for dumping purposes without in any way affecting its efficiency.

Sixth, to provide a drag of this class which is very economical of construction proportional to its functions, durable, efficient in its action, easy to operate, easy to install and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a side elevational view of a conventional dump truck showing my drag in combinative, operative relation therewith and showing by dotted lines the raised inoperative position of the drag in relation with the tilted body of the dump truck; Fig. 2 is a transverse sectional view through 2—2 of Fig. 1; and Fig. 3 is a longitudinal sectional view through 3—3 of Fig. 1.

Similar characters of reference refer to similar parts and portions throughout the several views of the drawing.

The dump truck 1 is a conventional dump truck of the type in which the dump body 1a is tilted with the front part up and the rear part down for dumping the contents at the rear end. The drag consists of a drag or leveling member 2, link members 3 and 4, link members 5, and link members 6.

The drag 2 is similar to the conventional type of drag consisting of a rectangular frame provided with a plurality of bars 2a and adapted when moved along the surface of a roadway or otherwise to level and scrape the ground over which it moves. It is supported at each end on opposite sides of the truck by means of link members 3 and 4. These link members are pivotally mounted on lugs at the four corners of the frame of the drag 2 as shown and are pivotally connected together at their upper ends by means of pins 5a, and interposed between the link members 2 and 3 and the pins 5a are the link members 5 which extend upwardly and are provided with elongated slots 5b in their upper ends. The upper ends of these link members 5 are mounted on pins 5c on the body 1a and are supported thereon by means of nuts 5d. This provides for shifting of the link members 5 in the elongated slots 5b to permit the drag to drag freely on the ground beneath the truck, but is suspended thereon so as not to permit too much movement.

Pivotally mounted on the front portion of the drag intermediate the ends by means of a rod 2b are the link members 6 which extend forwardly and upwardly and engage with bolts connected with the conventional spring shackle brackets 1b for the front spring of a truck as shown best in Fig. 1 of the drawing, and are supported thereon by means of nuts which may be readily removed for removing the link members 6.

It will be here noted that the connections between the link members and the spring shackle brackets 1b and the relative link members and the link members and the drag, and the link members and the dump box, are provided with sufficient clearance and play to permit slight movement so that the drag is suspended from the forward portion of the dump box 1a by means of the link members 3, 4 and 5, and is drawn by means of the link members 6 attached to the frame of the truck through the spring shackle brackets 1b.

Operation is as follows:

The drag is suspended on the truck as hereinbefore set forth ready for use as shown by solid lines in Fig. 1 of the drawing, and upon movement of the truck forward under its own power, the ground is dragged beneath the truck. If it is desired to skip certain portions, the dump body of the truck is operated in the conventional manner of operating the dump truck body by tilting the forward end up which raises the drag and link mechanism as shown by dotted lines in Fig. 1 of the drawing, and the truck with the drag may be moved to any other desired position for operation, and the truck body tilted back down as shown by solid lines, and the drag is again ready for operation.

When it is desired to remove the drag from the truck so that the dump truck may be used in the ordinary manner, as dump trucks of this class are used, the nuts may be removed from the pins 5c and the link members 5 sprung outwardly and released, then the nuts may be removed from the bolts in the spring shackle brackets 1b and the forward ends of the link members 6 removed from the bolts. The drag will then raise above the ground and the rear wheels of the truck may be driven over the drag and the truck is ready for operation free from the drag and its connecting portions.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a combined dump truck and road drag, the combination with a conventional dump truck with the body pivoted on an axis transversely to the truck, of a drag suspended from the front portion only of said truck body between the front and rear wheels of said truck only, and means connecting said drag forwardly of said drag to said truck.

2. In a combined dump truck and road drag, the combination with a conventional dump truck with the body pivoted on an axis transversely to the truck, of a drag suspended from the front portion only of said truck body between the front and rear wheels of said truck only, means connecting said drag forwardly of said drag to said truck and means in connection with said suspension means for permitting the ready removal of said drag from said truck dump body.

3. In a combined dump truck and road drag, the combination with a tilting dump truck of a drag member suspended on the forward portion only of said dump truck body and means connecting said drag with the truck in front of said drag.

4. In a combined dump truck and road drag, the combination with a tilting dump truck of a drag member suspended under said truck body and supported on the forward portion only of said dump truck body.

5. In a combined dump truck and road drag, the combination with a tilting dump truck of a drag member suspended under said truck and supported on the forward portion only of said dump truck body, means connecting said drag with the truck in front of said drag, the suspension means provided with means for permitting slight flexible movement between said truck body and said drag, and also provided with means for permitting the ready removal of said drag from said truck.

6. In a combined dump truck and road drag, the combination with a conventional dump body truck with the dump body pivoted on an axis transversely to the truck, of a drag suspended from the front portion only of said truck body and positioned between the front and rear wheels only of said truck and transversely with said truck, means connecting said drag forwardly of said drag to said truck, the suspension means provided with considerable play to permit slight movement of said truck relatively to said dump body, whereby said drag may raise and lower slightly relatively to said truck and may be raised and lowered to a non-operative and operative position with the conventional shifting of said dump body into dumping and non-dumping position.

In testimony whereof, I have hereunto set my hand at San Diego, California this 6th day of July, 1931.

HOWARD J. NEVIN.